(12) United States Patent
Soupart et al.

(10) Patent No.: US 11,198,618 B2
(45) Date of Patent: Dec. 14, 2021

(54) STABLE SYNTHETIC RHODOCHROSITE AND A METHOD FOR THE PRODUCTION THEREOF

(71) Applicant: Prince Minerals SRL, Saint-Ghislain (BE)

(72) Inventors: Jean-Bruno R. B. Soupart, Mons (BE); Christian A. A. De Vos, Quevy Bougnies (BE)

(73) Assignee: Prince Minerals SRL, Saint-Ghislain (BE)

( * ) Notice: Subject to any disclaimer, the term of this patent is extended or adjusted under 35 U.S.C. 154(b) by 155 days.

(21) Appl. No.: 16/500,221

(22) PCT Filed: Apr. 5, 2018

(86) PCT No.: PCT/IB2018/052384
§ 371 (c)(1),
(2) Date: Oct. 2, 2019

(87) PCT Pub. No.: WO2018/185713
PCT Pub. Date: Oct. 11, 2018

(65) Prior Publication Data
US 2020/0062612 A1 Feb. 27, 2020

Related U.S. Application Data

(60) Provisional application No. 62/482,447, filed on Apr. 6, 2017.

(51) Int. Cl.
*C01G 45/00* (2006.01)

(52) U.S. Cl.
CPC .................. *C01G 45/00* (2013.01)

(58) Field of Classification Search
CPC ............................ C01G 45/00; C01G 45/1221
See application file for complete search history.

(56) References Cited

U.S. PATENT DOCUMENTS

| | | |
|---|---|---|
| 2,093,460 A | 9/1937 | MacIntire |
| 2,758,012 A | 8/1956 | Welsh et al. |
| 4,276,268 A | 6/1981 | Welsh et al. |

FOREIGN PATENT DOCUMENTS

| | | | |
|---|---|---|---|
| CN | 1283592 A | | 2/2001 |
| CN | 103276192 A | * | 9/2013 |
| CN | 106145199 A | | 11/2016 |

OTHER PUBLICATIONS

Bu, Yong-jie, et al. "Synergistic mechanism between SDBS and oleic acid in anionic flotation of rhodochrosite." International Journal of Minerals, Metallurgy, and Materials 22.5 (2015): 447-452.*

(Continued)

*Primary Examiner* — Richard M Rump
(74) *Attorney, Agent, or Firm* — The Webb Law Firm (57) ABSTRACT

A stable rhodochrosite comprising manganese carbonate ($MnCO_3$) and 0.03-0.3 wt % of an anion or ligand of phosphoric acid ($H_3PO_4$), pyrophosphoric acid ($H_4P_2O_7$), an organic acid, or a salt of such acids, or 0.03-0.3 wt % of a mixture of such anions and/or ligands. Also, a method of producing stable rhodochrosite comprising manganese carbonate ($MnCO_3$) in which a rhodochrosite comprising manganese carbonate ($MnCO_3$) is treated by applying an aqueous treatment solution of phosphoric acid ($H_3PO_4$), pyrophosphoric acid ($H_4P_2O_7$), sulfuric acid ($H_2SO_4$), an organic acid, or a salt of such acids, or a mixture thereof and the treated rhodochrosite is dried to produce stable rhodochrosite.

20 Claims, 1 Drawing Sheet

(56) References Cited

OTHER PUBLICATIONS

English machine translation of CN1283592A.*
English machine translation of CN106145199A.*
Chen et al., "Carbonation precipitation of manganese from electrolytic manganese residue treated by CO2 with alkaline additives", Proceedings of the 2015 2nd International Conference on Machinery, Materials Engineering, Chemical Engineering and Biotechnology, 2016, pp. 721-726.
Xiao et al., "High Capacity and Self-Stabilized Manganese Caronate Microspheres as Anode Material for Lithium-Ion Batteries", ACS Applied Materials & Interfaces, 2016, pp. 25369-25378, vol. 8, No. 38.

* cited by examiner

US 11,198,618 B2

1

STABLE SYNTHETIC RHODOCHROSITE AND A METHOD FOR THE PRODUCTION THEREOF

CROSS-REFERENCE TO RELATED APPLICATIONS

The present application is the United States national phase of International Application No. PCT/IB2018/052384 filed Apr. 5, 2018, and claims priority to U.S. Provisional Patent Application No. 62/482,447, filed Apr. 6, 2017 entitled "Stable Synthetic Rhodochrosite and Method for Its Production", the disclosures of which are hereby incorporated by reference in their entirety.

FIELD OF THE INVENTION

The invention relates to stable synthetic rhodochrosite that is resistant to oxidation during storage and a method of making such stable synthetic rhodochrosite.

BACKGROUND OF THE INVENTION

Synthetic rhodochrosite comprising manganese carbonate ($MnCO_3$) is one of the main precursors for the preparation of pure manganese salts such as manganese nitrate (Mn($NO_3$)$_2$), manganese sulfate ($MnSO_4$), manganese chloride ($MnCl_2$), manganese acetate ($C_4H_6MnO_4$), manganese phosphate ($Mn_3(PO_4)_2$, $MnHPO_4$, or $Mn(H_2PO_4)_2$), which may be produced by combining the synthetic rhodochrosite with an appropriate acid. Synthetic rhodochrosite may be precipitated by reacting a solution comprising a manganese salt with a solution containing ammonium carbonate, followed by separation of the precipitate (referred to herein as "freshly prepared synthetic rhodochrosite precipitate") from the solution (referred to herein as "reaction solution") and subsequent drying of the separated precipitate.

Synthetic rhodochrosite is thermodynamically unstable as evidenced by thermodynamic data obtained from *HSC Chemistry 7, v7.11* (a software package distributed by Outotec) which shows that the equilibrium constant (log K (25° C.)=8.684) for the oxidation reaction for manganese carbonate ($MnCO_3$) is a large positive number:

$$MnCO_3 + \tfrac{1}{2}O_2 \text{ (g)} \rightleftharpoons MnO_2 + CO_2 \text{ (g)}.$$

Because synthetic rhodochrosite is thermodynamically unstable, the formation of higher oxides of manganese, such as $Mn_3O_4$, $Mn_2O_3$, MnOOH or $MnO_2$, is virtually inevitable. As described in U.S. Pat. No. 2,758,012, the oxidation kinetics will depend on several factors including the temperature and the relative humidity of the atmosphere in which the synthetic rhodochrosite is stored.

Since the main usage of synthetic rhodochrosite requires dissolution in a mineral or organic acid, the presence of higher oxide(s) of manganese is undesirable because such oxide(s) may impede the dissolution of the synthetic rhodochrosite and may lead to the presence of acid-insoluble matter. Although the acid-insoluble matter can be compensated for by the addition of an appropriate reducing agent, such as ferrous ions or hydrogen peroxide, such additions are not always an acceptable process option.

Furthermore, the oxidation of the synthetic rhodochrosite leads to a color change from pink-beige to brown and tends to cause caking or clumping of the material making handling difficult.

SUMMARY OF THE INVENTION

The present invention is directed to a stable rhodochrosite comprising manganese carbonate ($MnCO_3$) and 0.03-0.3 wt

2

% of an anion or ligand of phosphoric acid ($H_3PO_4$), pyrophosphoric acid ($H_4P_2O_7$), an organic acid, or a salt of such acids, or 0.03-0.3 wt % of a mixture of such anions and/or ligands. The anion or ligand may be phosphate ($PO_4^{3-}$), pyrophosphate ($P_2O_7^{4-}$), citrate ($C_6H_5O_7^{3-}$), oxalate ($C_2O_4^{2-}$), acetate ($C_2H_3O^{2-}$), tartrate ($C_4H_4O_6^{2-}$), and/or the ligand of ethylenediaminetetracetic acid ($[EDTA]^{4-}$). The organic acid may be citric acid ($C_6H_8O_7$), oxalic acid ($C_2H_2O_4$), acetic acid ($C_2H_4O_2$), tartaric acid ($C_4H_6O_6$), and/or ethylenediaminetetraacetic acid ($C_{10}H_{16}N_2O_8$). The salt of such acids may be mono-sodium phosphate ($NaH_2PO_4$), di-sodium phosphate ($Na_2HPO_4$), tri-sodium phosphate ($Na_3PO_4$), tetra-sodium phosphate ($Na_4P_2O_7$), mono-sodium citrate ($C_6H_7NaO_7$), di-sodium citrate ($C_6H_6Na_2O_7$), tri-sodium citrate ($Na_3C_6H_5O_7$), di-sodium oxalate ($Na_2C_2O_4$), mono-potassium acetate ($KCH_3COO$), mono-potassium tartrate ($C_4H_5KO_6$), and/or tri-potassium ethylenediaminetetraacetic acid (tri-potassium EDTA, $C_{10}H_{13}K_3N_2O_8$).

The present invention is also directed to a method of producing stable rhodochrosite comprising manganese carbonate ($MnCO_3$). A provided rhodochrosite comprising manganese carbonate ($MnCO_3$) is treated by applying an aqueous treatment solution of phosphoric acid (H3PO4), pyrophosphoric acid ($H_4P_2O_7$), sulfuric acid ($H_2S$), an organic acid, or a salt of such acids, or a mixture thereof and the treated rhodochrosite is dried to produce stable rhodochrosite. The organic acid may be citric acid (C6H8O7), oxalic acid ($C_2H_2O_4$), acetic acid ($C_2H_4O2$), tartaric acid ($C_4H_6O_6$), and/or ethylenediaminetetraacetic acid ($C_{10}H_{16}N_2O_8$). The salt may be mono-sodium phosphate ($NaH_2PO_4$), di-sodium phosphate ($Na_2HPO_4$), tri-sodium phosphate ($Na_3PO_4$), tetra-sodium phosphate (Na4P2O7), mono-sodium citrate ($C_6H_7NaO_7$), di-sodium citrate ($C_6H_6Na_2O_7$), tri-sodium citrate ($Na_3C_6H_5O_7$), potassium sulfate ($K_2SO_4$), di-sodium oxalate ($Na_2C_2O_4$), mono-potassium acetate ($KCH_3COO$), mono-potassium tartrate ($C_4H_5KO_6$), and/or tri-potassium ethylenediaminetetraacetic acid (tri-potassium EDTA, $C_{10}H_{13}K_3N_2O_8$).

The application of the aqueous treatment solution may include displacement of liquid contained in the rhodochrosite with an approximately equal amount of treatment solution. Alternatively, the aqueous treatment solution may be sprayed onto or mixed with the rhodochrosite.

The aqueous treatment solution applied to the rhodochrosite may comprise 0.3-3.0 grams of anions and/or ligands of the phosphoric acid ($H_3PO_4$), pyrophosphoric acid ($H_4P_2O_7$), sulfuric acid ($H_2SO4$), organic acids, or salts of such acids for each 1000 grams, on a dried basis, of rhodochrosite that is being treated. The anion or ligand may be phosphate ($PO_4^{3-}$), pyrophosphate ($P_2O_7^{4-}$), sulfate ($SO_4^{2-}$), citrate ($C_6H_5O_7^{3-}$), oxalate ($C_2O_4^{2-}$), acetate ($C_2H_3O_2^-$), tartrate ($C_4H_4O_6^{2-}$), and/or the ligand of ethylenediaminetetracetic acid ($[EDTA]^{4-}$).

The provided rhodochrosite may comprise a manganese carbonate (MnCO3) precipitate obtained by mixing a solution comprising Mn with a solution containing carbonate from which a manganese carbonate ($MnCO_3$) precipitates and a reaction solution is formed. The manganese carbonate ($MnCO_3$) precipitate may be substantially separated from the reaction solution but still contain residual reaction solution and may be washed at least once with water to dilute the residual reaction solution remaining in the manganese carbonate ($MnCO_3$) precipitate.

The dried rhodochrosite may comprise at most 3% residual liquid.

The stable rhodochrosite made according to this method comprises 0.03-0.3 wt % of an anion or ligand of the phosphoric acid ($H_3PO_4$), sulfuric acid ($H_2SO_4$), organic acid, or a salt of such acids.

DESCRIPTION OF THE INVENTION

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Plural encompasses singular and vice versa. When ranges are given, any endpoints of those ranges and/or numbers within those ranges can be combined with the scope of the present invention. "Including", "such as", "for example" and like terms means "including/such as/for example but not limited to".

The present invention is directed to a stable synthetic rhodochrosite which comprises manganese carbonate, $MnCO_3$ and a method of making such a stable synthetic rhodochrosite. As used herein, "stable" indicates that the rhodochrosite is resistant to oxidation, such that it also resists caking or clumping and color change that are associated with oxidation, and therefore may be stored for longer periods of time as opposed to typical rhodochrosite.

The stable synthetic rhodochrosite comprises manganese carbonate, $MnCO_3$, and at least 0.03 wt % of an anion or ligand of phosphoric acid ($H_3PO_4$), pyrophosphoric acid ($H_4P_2O_7$), sulfuric acid ($H_2SO_4$), an organic acid, or a salt of such acids, for example, at least 0.05 wt % or at least 0.07 wt %, and up to 0.3% of an anion or ligand of phosphoric acid ($H_3PO_4$), pyrophosphoric acid ($H_4P_2O_7$), sulfuric acid ($H_2SO_4$), an organic acid, or a salt of such acids, for example, up to 0.2 wt %, or up to 0.15 wt %. The stable synthetic rhodochrosite may comprise 0.03-0.3 wt % of an anion or ligand of phosphoric acid ($H_3PO_4$), sulfuric acid ($H_2SO_4$), an organic acid, or a salt of such acids, for example, 0.05-0.2 wt % or 0.07-0.15 wt %.

As used herein, an "anion" of an acid is the ion of the fully protonated acid after all protons have been removed. For example, the anion associated with each of $H_3PO_4$, $NaH_2PO_4$, $Na_2HPO_4$, or $Na_3PO_4$ is $PO_4^{3-}$. As used herein a "ligand" of an acid is the ligand associated with the fully protonated version of an acid. For example, ethylenediaminetetraacetic acid ($H_4[EDTA]$) and tri-potassium ethylenediaminetetraacetic acid ($HK_3[EDTA]$) both have the same ligand, namely $[EDTA]^{4-}$.

Suitable organic acids include citric acid ($C_6H_8O_7$), oxalic acid ($C_2H_2O_4$), acetic acid ($C_2H_4O_2$), tartaric acid ($C_4H_6O_6$), and ethylenediaminetetraacetic acid ($H_4[EDTA]$, $H_4[C_{10}H_{12}N_2O_8]$). Suitable salts include salts of an acid in which each proton of the acid is replaced by, for example, alkali ions, ammonium ions, alkali earth or other metals ions, or a combination thereof, and may include salts of an acid that feature several protons. Such suitable salts include mono-sodium phosphate ($NaH_2PO_4$), di-sodium phosphate ($Na_2HPO_4$), tri-sodium phosphate ($Na_3PO_4$), tetra-sodium pyrophosphate ($Na_4P_2O_7$), mono-sodium citrate ($C_6H_7NaO_7$), di-sodium citrate ($C_6H_6Na_2O_7$), tri-sodium citrate ($Na_3C_6H_5O_7$), potassium sulfate ($K_2SO_4$), di-sodium oxalate ($Na_2C_2O_4$), mono-potassium acetate ($C_2H_3KO_2$), mono-potassium tartrate ($C_4H_5KO_6$), and tri-potassium ethylenediaminetetraacetic acid ($HK_3[EDTA]$; $HK_3[C_{10}H_{12}N_2O_8]$). Suitable anions and ligands include the anions, phosphate ($PO_4^{3-}$), pyrophosphate ($P_2O_7^{4-}$), sulfate ($SO_4^{2-}$), citrate ($C_6H_5O_7^{3-}$), oxalate ($C_2O_4^{2-}$), acetate ($C_2H_3O_2^-$), and tartrate ($C_4H_4O_6^{2-}$), and the ligand ethylenediaminetetracetic acid ($[EDTA]^{4-}$).

The present invention is also directed to a method of making stable synthetic rhodochrosite. In the inventive method, synthetic rhodochrosite is provided and then treated using a treatment solution of phosphoric acid ($H_3PO_4$), pyrophosphoric acid ($H_4P_2O_7$), sulfuric acid ($H_2SO_4$), an organic acid, or a salt of such acids. The treatment solution may be aqueous. The organic acid may be, for example, citric acid ($C_6H_8O_7$), oxalic acid ($C_2H_2O_4$), acetic acid ($C_2H_4O_2$), tartaric acid ($C_4H_6O_6$), and ethylenediaminetetraacetic acid ($H_4[EDTA]$, $H_4[C_{10}H_{12}N_2O_8]$). The salts may be, for example, mono-sodium phosphate ($NaH_2PO_4$), di-sodium phosphate ($Na_2HPO_4$), tri-sodium phosphate ($Na_3PO_4$), tetra-sodium phosphate ($Na_4P_2O_7$), mono-sodium citrate ($C_6H_7NaO_7$), di-sodium citrate ($C_6H_6Na_2O_7$), tri-sodium citrate ($Na_3C_6H_5O_7$), potassium sulfate ($K_2SO_4$), di-sodium oxalate ($Na_2C_2O_4$), mono-potassium acetate ($C_2H_3KO_2$), mono-potassium tartrate ($C_4H_5KO_6$), and tri-potassium ethylenediaminetetraacetic acid (tri-potassium EDTA ($C_{10}H_{13}K_3N_2O_8$)).

Figure 1:
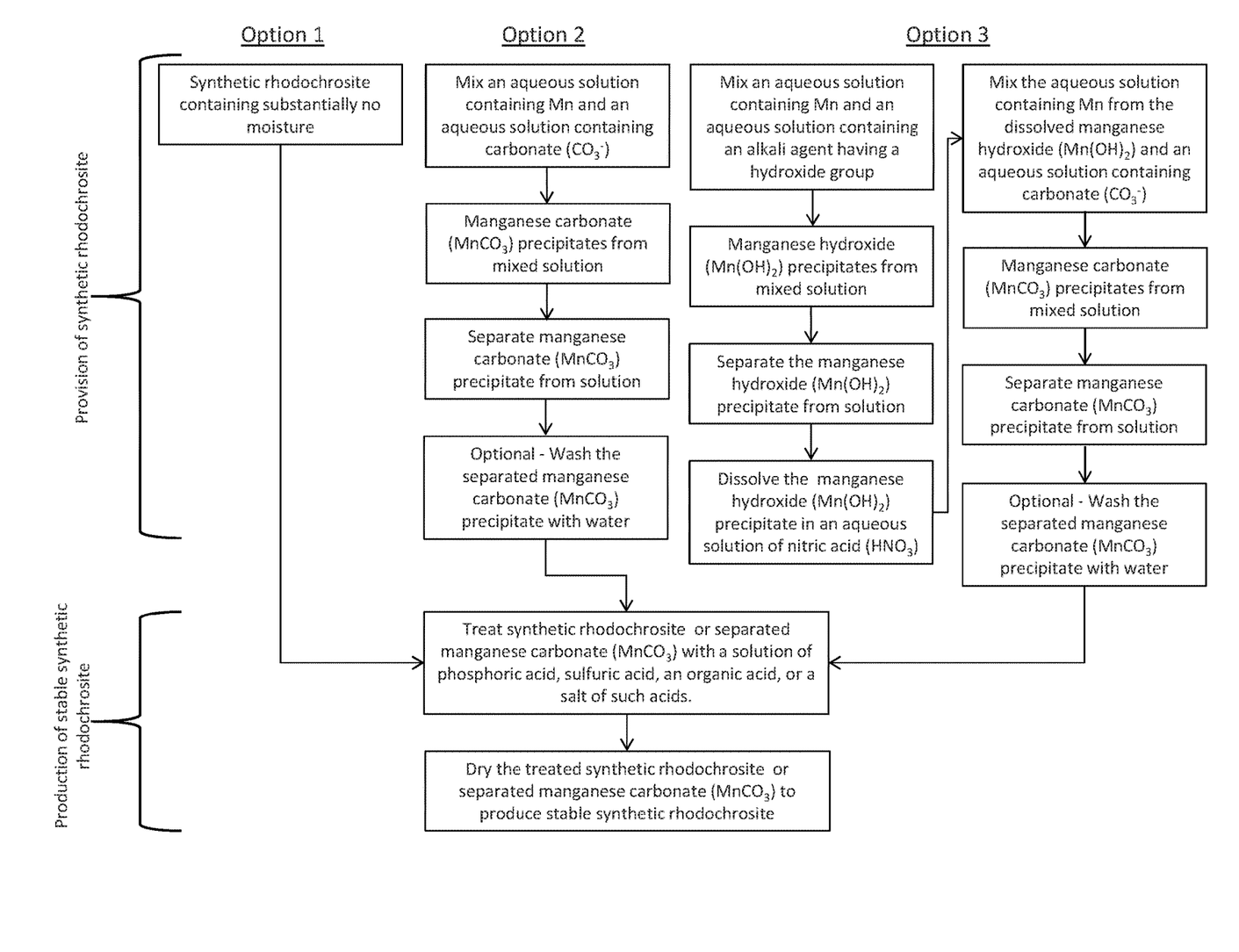
FIG. 1 is a flow chart showing various methods for producing stable synthetic rhodochrosite according to the invention.

The treatment of the rhodochrosite with the treatment solution may be conducted by applying the treatment solution to the provided rhodochrosite, which may be a dried synthetic rhodochrosite (see FIG. 1, Option 1) or freshly precipitated synthetic rhodochrosite after the separation of the precipitated synthetic rhodochrosite from the reaction solution (see FIG. 1, Options 2 and 3). Optionally, the freshly precipitated synthetic rhodochrosite may have been washed with water before providing the rhodochrosite. Some amount of the reaction solution or water from the washing may be entrapped in the freshly precipitated synthetic rhodochrosite. "Applying" the treatment solution is meant to include spraying the treatment solution onto the synthetic rhodochrosite, displacement washing of the synthetic rhodochrosite with the treatment solution, mixing the treatment solution with the synthetic rhodochrosite, suspending the synthetic rhodochrosite in the treatment solution, or the like. "Displacement washing" as used herein is a process in which the amount of reaction solution or water contained in the freshly precipitated synthetic rhodochrosite is displaced by an equivalent amount of treatment solution. For example, 100 grams of freshly precipitated synthetic rhodochrosite having 11.5 wt % or 11.5 grams of reaction solution or water would be displacement washed using 11.5 grams of treatment solution. Such displacement washing may be carried out on a filter. If the treatment solution is sprayed on the provided rhodochrosite, the material may be homogenized after spraying, for example, by mixing in a v-blender, by tumbling inside a tube, or by mixing with mixing screws may be added. "Mixing" may be conducted by combining the treatment solution and the provided rhodochrosite in a blender, for example, a v-blender or a Turbula 3D mixer.

The amount and concentration of the treatment solution is adjusted so that the concentration of an anion or ligand of phosphoric acid ($H_3PO_4$), pyrophosphoric acid ($H_4P_2O_7$), sulfuric acid ($H_2SO_4$), an organic acid, or a salt of such acids added to the provided rhodochrosite will be 0.03-0.3 wt % in the dried stable synthetic rhodochrosite. The anion or ligand may be, for example, phosphate ($PO_4^{3-}$), pyrophosphate ($P_2O_7^{4-}$), sulfate ($SO_4^{2-}$), citrate ($C_6H_5O_7^{3-}$), oxalate ($C_2O_4^{2-}$), acetate ($C_2H_3O_2^{-}$), tartrate ($C_4H_4O_6^{2-}$), or the ligand of ethylenediaminetetraacetic acid ($[EDTA]^{4-}$). The provided synthetic rhodochrosite that is treated may be produced in such a manner that it contains negligible levels, i.e., 0.01 wt % or less of the anion or ligand prior to treatment, and after treatment contains an additional 0.03-0.3 wt % of the anion or ligand.

There is no minimum concentration of the anion or ligand in the treatment solution. However, the concentration should be sufficient to provide the desired amount of anion or ligand (e.g., 0.03-0.3 wt %) to the stable synthetic rhodochrosite without requiring an excessive volume of the treatment solution. From a practical aspect, it is desirable to minimize the cost associated with the drying of the treated synthetic rhodochrosite. Therefore, the treatment solution contained in the treated synthetic rhodochrosite should not exceed about 25 wt % and the treatment solution should therefore contain at least about 0.09 wt % of the anion or ligand. The maximum concentration of the anion or ligand in the treatment solution is determined by the solubility limit of the acid or salt that is used in the treatment solution. For example, the concentration of the anion or ligand in the treatment solution may be at least 0.9 grams per kilogram, for example, 1.5 grams per kilogram, 5 grams per kilogram, or 10 grams per kilogram, and may be at most 200 grams per kilogram, for example, 125 grams per kilogram, or 100 grams per kilogram. The concentration of the anion or ligand in the treatment solution may be 0.9-200 grams per kilogram, 1.5-125 grams per kilogram, or 10-100 grams per kilogram.

The quantity of aqueous solution applied to the synthetic rhodochrosite may comprise 0.3-3.0 grams of the anion or ligand of the phosphoric acid ($H_3PO_4$), pyrophosphoric acid ($H_4P_2O_7$), sulfuric acid ($H_2SO_4$), organic acid, or salt of such acids for each 1000 grams, on a dried basis, of synthetic rhodochrosite that is treated such that the produced stable synthetic rhodochrosite comprises 0.03-0.3 wt % of the anion or ligand.

Suitable amounts (A) of the treatment solution and concentrations (C) of the anion or ligand in the treatment solution are determined based on the application method that is used to apply the treatment solution, the amount (R) of synthetic rhodochrosite that will be obtained after treatment on a dried basis, the concentration (W) of the anion or ligand that is desired in the treated stable synthetic rhodochrosite on a dry basis, and the amount ($S_1$) of water or reaction solution that is contained in the provided rhodochrosite.

When the treatment solution is applied using a displacement wash, the amount of water or reaction solution that is contained in the provided synthetic rhodochrosite ($S_1$) is replaced by treatment solution. This method of applying the treatment solution may be used when the provided rhodochrosite is a freshly precipitated rhodochrosite that has been separated from the reaction solution and, optionally, washed with water. The concentration (C) of the anion or ligand in the treatment solution is $$C = \frac{R \times W}{S_1}$$

The dissolved solids in the water or reaction solution ($S_1$) are considered to be negligible, such that the weight of the provided rhodochrosite is $$S_1 + [R \times (1-W)].$$

The "liquid content" (X) of the provided rhodochrosite is $$X = S_1/(S_1 + [R \times (1-W)]).$$

For W<<1, such as the desired range of 0.03-0.3 wt % discussed above, $$C = \frac{(1-X) \times W}{X}$$

As stated above, the amount, A, of treatment solution needed for the displacement washing is equal to the amount $S_1$, i.e., $A = S_1$. However, an amount $A > S_1$ may be used, such as $A = 1.5 \times S_1$ or $A = 2 \times S_1$.

For example, if 1000 grams of provided rhodochrosite having an 11.5 wt % liquid (water or reaction solution) content is to be treated by displacement washing to produce a stable synthetic rhodochrosite having 0.1 wt % of the anion or ligand, the following calculations may be used to determine the concentration of treatment solution that is to be used. The liquid content is X=0.115 and the desired anion or ligand concentration in the treated stable synthetic rhodochrosite on a dry basis is W=0.001. Therefore, the concentration (C) of anion or ligand in the treatment solution is C=0.001×(1−0.115)/0.115=0.0077 or 7.7 grams of anion or ligand per one kilogram of treatment solution. 0.115 kilograms of treatment solution, an amount equal to the moisture content of the provided rhodochrosite, is used.

When other modes of application are used, the amount of treatment solution can be determined based on the concentration that is to be used or the concentration of the treatment solution can be determined based on the amount of treatment solution that is to be used.

If applying of the treatment solution is conducted by spraying or mixing, then it is desirable to limit the amount of treatment solution, so that the total amount of liquid from the treatment solution and the liquid contained in the provided synthetic rhodochrosite is not excessive, i.e., does not exceed about 25 wt %. This consideration then predetermines the volume (V) of treatment solution. The volume (V) of treatment solution is determined based on the desired liquid fraction (L) after the treatment solution has been added to the provided synthetic rhodochrosite as follows.

$$V = \frac{1\ l}{1\ \mathrm{kg}} \times \left[\frac{R}{(1-L)} - R_1\right]$$

where $R_1$ is the amount of provided synthetic rhodochrosite that is to be treated including any liquid that is present in the provided synthetic rhodochrosite and R is as defined above.

The concentration (C) of the anion or ligand in the treatment solution is then $$C = \frac{R \times W}{V}$$

where $R_2$ is the total weight of the produced stable synthetic rhodochrosite (starting rhodochrosite (R)+weight of anion or ligand).

For example, if 1 kilogram of provided rhodochrosite ($R_1$) having a 15 wt % liquid (water or reaction solution) content (i.e., L=0.15; 0.150 kilograms liquid) is to be treated by spraying or mixing to produce a stable synthetic rhodochrosite having 0.1 wt % of the anion or ligand (i.e., W=0.001 and $R=R_1 \times (1-L)/(1-W)$=0.85085 kg), the following calculations may be used to determine the amount and concentration of treatment solution that is to be used. It may be desirable to limit the liquid fraction (L) of the treated synthetic rhodochrosite that is subjected to drying to about 0.18 such that the amount of treatment solution is V=[((0.85085)/(1−0.18)−1)] liters=0.038 liters. The concentration of the anion or ligand in the treatment solution is then C=(0.85085 kg×0.001)/(0.0381)=0.0226 kilograms per liter or 22.6 grams per liter of treatment solution.

If the provided rhodochrosite is suspended in the treatment solution, then it is preferred that application of the treatment solution includes a solid/liquid separation step, such as a filtration step. Then, the residual moisture in the filter cake would correspond to the amount $S_1$ described above and the concentration of the treatment solution may be $C=R \times W/S_1$. The amount, A, of treatment solution would typically be between 2-10 times the amount of the provided synthetic rhodochrosite.

The treated synthetic rhodochrosite is then dried to obtain stable synthetic rhodochrosite. After drying, the treated synthetic rhodochrosite may have a liquid content of less than about 3%, such as less than 2%. The treated synthetic rhodochrosite may be dried using a forced-air oven or a flash dryer (Lab Spin-Flash Dryer, model 01.5.47 from APV Anhydro AS). The drying temperature may be at least 100° C., for example, at least 120° C. or 140° C., and up to 220° C., for example, up to 200° C. or 190° C. such that the drying temperature is 100-220° C., 120-200° C., or 140-190° C. For example, if the treated synthetic rhodochrosite precipitate is flash dried the entry temperature may be 250° C. and the exit temperature may be 100° C. If the treated synthetic rhodochrosite is dried in a forced-air oven, the temperature may be 150° C. for 1 hour or 180° C. for 0.75 hour. The drying may include a pre-drying step at a lower temperature, for example, at least 50° C. or at least 60° C., for at least 1 hour, at least 2 hours, or at least 3 hours. For example, drying in a forced-air oven may include a pre-drying step of 3 hours at 70° C. followed by drying for 1 hour at 150° C.

The provided synthetic rhodochrosite that is to be treated according to the present invention may be precipitated from an aqueous solution containing manganese and carbonate, which is obtained by continuously mixing an aqueous manganese solution with an aqueous carbonate solution (see FIG. 1, option 2). The aqueous manganese solution may be a manganese salt solution. The manganese salt solution may be a solution of manganese nitrate ($Mn(NO_3)_2$) or manganese sulfate ($MnSO_4$) and the aqueous carbonate solution may be a solution of ammonium carbonate (($NH_4)_2CO_3$) or sodium carbonate ($Na_2CO_3$). Such a manganese nitrate solution is commercially available from Prince Erachem Inc. or may be prepared as described below. Such a manganese sulfate solution is commercially available from Prince Erachem SPRL. An ammonium carbonate solution can be prepared by combining ammonium hydroxide solution and carbon dioxide gas, as is known in the art. Similarly, a sodium carbonate, i.e., soda ash, solution may be prepared as is known in the art.

The manganese solution may have at least 50 grams per liter of Mn, for example, at least 80 grams per liter or at least 120 grams per liter, and may have up to 200 grams per liter of Mn, for example, up to 190 grams per liter or up to 180 grams per liter such that the manganese solution has 50-200 grams per liter Mn, for example, 80-190 grams per liter or 120-180 grams per liter.

The carbonate solution may have a specific gravity at 20° C. of at least 1.05 and up to 1.15, for example, 1.05-1.15.

The flow rates of the manganese solution and the carbonate solution are adjusted such that the molar ratio of carbonate to Mn is at least 1.0, for example, at least 1.01 or at least 1.02, and up to 1.1, for example, up to 1.09 or up to 1.08, such that the molar ratio of carbonate to Mn is 1.0-1.1, for example, 1.01-1.09 or 1.02-1.08.

The temperature of the mixed solution may be at least 10° C., for example, at least 25° C. or at least 30° C., and up to 60° C., for example, up to 55° C. or up to 50° C., such that the temperature of the mixed solution is 10-60° C., for example, 25-55° C. or 30-50° C.

After mixing the manganese solution and the carbonate solution, synthetic rhodochrosite comprising manganese carbonate ($MnCO_3$) will precipitate from the reaction solution.

As an example, if the manganese salt solution is an aqueous manganese nitrate ($Mn(NO_3)_2$) solution and the carbonate solution is an aqueous ammonium carbonate (($NH_4)_2CO_3$) solution, the following reaction will occur and the synthetic rhodochrosite, comprising manganese carbonate ($MnCO_3$), will precipitate while ammonium nitrate ($NH_4NO_3$) will remain in the reaction solution.

A suspension of the synthetic rhodochrosite precipitate in the reaction solution is continuously removed from the mixing process. The precipitate is separated from the reaction solution by, for example, filtration, settling or centrifugation. At the beginning of the mixing process of the manganese solution and carbonate solution, the separated precipitate may be recycled back into the reaction solution to maintain a solids concentration in the reaction solution of 5-25% by weight.

The separated synthetic rhodochrosite precipitate may be directly treated to produce stable synthetic rhodochrosite as described above or may be washed with water, for example, deionized water, before being treated to produce stable synthetic rhodochrosite. Washing may be accomplished by spraying water on a filter containing the separated synthetic rhodochrosite precipitate or a filter cake of the separated synthetic rhodochrosite precipitate and/or re-suspending the separated synthetic rhodochrosite precipitate in water followed by a second separation step. More than one washing step may be performed on the synthetic rhodochrosite precipitate.

As one example, manganese nitrate solution of high purity may be prepared as described below. A solution containing manganese may be prepared from manganese hydroxide ($Mn(OH)_2$) that is formed by reacting a manganese salt and an alkali agent in an aqueous solution (see FIG. 1, option 3). Suitable manganese salts include, but are not limited to, manganese nitrate ($Mn(NO_3)_2$), manganese sulfate ($MnSO_4$), or manganese chloride ($MnCl_2$). The alkali agent may include a hydroxide group provided in a compound such as, but not limited to an alkali metal hydroxide (e.g., sodium hydroxide (NaOH), potassium hydroxide (KOH)), or ammonium hydroxide ($NH_4OH$)).

The first aqueous solution may be made by mixing an aqueous solution of a manganese salt and an aqueous solution of an alkali agent comprising a hydroxide group to form a solution comprising up to 180 grams per liter of Mn, such as a solution comprising 5-180 grams per liter of Mn, 20-180 grams per liter of Mn, or 100-180 grams per liter of Mn, and an alkali agent in sufficient quantity to yield a hydroxide group to manganese molar ratio of 2.00-2.15. The Mn concentration is kept as high as possible yet below the saturation level where the manganese salt would precipitate from the solution in the absence of an alkali agent. The saturation level, as is understood in the art, depends on the type of manganese salt and the temperature of the solution.

The aqueous solution of a manganese salt and the aqueous solution of an alkali agent may be introduced into a reactor at constant flow rates to achieve a hydroxide group to manganese molar ratio of 2.00-2.15. Mixing in the reactor may be achieved using a two blade stirrer at a stirring speed of up to 100 rpm to avoid any air entrapment. The reactor may be maintained at a temperature of 5-40° C., such as a temperature of 5-30° C. or 10-20° C. After all of the aqueous solution of a manganese salt and the aqueous solution of an alkali agent have been introduced into the reactor, stirring may be continued until the formation of manganese hydroxide has been completed, which may be for at least 20 minutes.

For example, an aqueous manganese nitrate ($Mn(NO_3)_2$) solution and an aqueous ammonium hydroxide ($NH_4OH$) solution may be mixed. The aqueous manganese nitrate ($Mn(NO_3)_2$) solution may be prepared according to the teachings of U.S. Pat. No. 4,276,268 (incorporated herein by reference), and the ammonium hydroxide ($NH_4OH$) may be provided as a commercially available aqueous solution such as, but not limited to a solution having 25 wt % ammonia ($NH_3$) in an aqueous solution. The manganese nitrate and the ammonium hydroxide in the aqueous solution react according to the reaction:

$$Mn(NO_3)_2 + 2NH_4OH \rightarrow Mn(OH)_2 + 2NH_4NO_3$$

The resulting manganese hydroxide ($Mn(OH)_2$) is separated from the solution by filtration, settling, or centrifugation. The separated manganese hydroxide ($Mn(OH)_2$) may further be treated, such as by washing with water (e.g., demineralized water) to remove anions from the manganese salt, such as nitrates, sulfates, or chlorides, that may remain entrapped in the manganese hydroxide ($Mn(OH)_2$). The adequate removal of anions can be determined by measuring the conductivity of the filtrate. A conductivity of less than 1 mS/cm indicates that the manganese hydroxide has been adequately washed.

The separated manganese oxide ($Mn(OH)_2$) is then dissolved in an aqueous nitric acid ($HNO_3$) solution to form a solution containing Mn and nitrate which is then mixed with the carbonate solution.

EXAMPLES

In the following examples, the oxidation level of the synthetic rhodochrosite before and after accelerated storage testing, the color of the synthetic rhodochrosite before and after accelerated storage testing, and the flowability before and after accelerated storage testing were determined using the following procedures.

Determination of the Oxidation Level

The oxidation level of the examples is expressed as the weight percent of $MnO_2$ (% $MnO_2$). Higher % $MnO_2$ indicates a higher oxidation level. The $MnO_2$ content of the synthetic rhodochrosite was determined by potentiometric titration using potassium permanganate after dissolution of the synthetic rhodochrosite sample in an excess of acidic ferrous sulfate solution, where the ferrous ions reduce the higher oxides of manganese as described in Glover, Schumm, and Kozawa (eds.), *Handbook of Manganese Dioxide Battery Grade*, The International Battery Material Association, 1989.

Accelerated Storage Test

In order to determine the resistance of the synthetic rhodochrosite to oxidation during storage, an accelerated storage test was conducted. The oxidation level of the synthetic rhodochrosite was first determined as described above. Then, 80-100 grams of the synthetic rhodochrosite was placed in a glass crystallizing dish (manufactured by the Duran Group) with an internal diameter of 75 millimeters and wall height of 40 millimeters. The layer of synthetic rhodochrosite had a thickness of 5-15 millimeters. The glass dish containing the synthetic rhodochrosite was placed in a climate oven (Constant Climate Chamber HPP 110 from Memmert) and held at 45° C. and 80% relative humidity for 4 weeks. After 4 weeks in the climate oven, the oxidation level of the synthetic rhodochrosite was determined as described above. The color and flowability were also qualitatively characterized.

The flowability was characterized on a scale from 0 to 4. A flowability score of 0 indicates that the synthetic rhodochrosite particles were completely adhered to one another forming a single solid mass. A flowability score of 1 indicates that synthetic rhodochrosite particles were adhered to one another to form several large agglomerated masses. A flowability score of 2 indicates that the synthetic rhodochrosite particles had a propensity to stick together such that the particles did not flow freely but did not formed large lumps. A flowability score of 3 indicates that the synthetic rhodochrosite particles had some propensity to stick together, but still flowed, albeit, poorly. A flowability score of 4 indicates that the synthetic rhodochrosite particles flowed freely, almost like a liquid.

The conditions used to prepare the examples are summarized in Table 1, and the characteristics of the synthetic rhodochrosite produced in the examples are summarized in Table 2.

Comparative Example 1

An aqueous manganese nitrate solution ($Mn(NO_3)_2$) was prepared according to the teachings of U.S. Pat. No. 4,276,268. An aqueous ammonium hydroxide solution ($NH_4OH$) was prepared. The solutions were mixed such that the resulting mixed solution had about 115 grams per liter Mn and a hydroxide group to manganese molar ratio of about 2.05. The precipitated manganese hydroxide ($Mn(OH)_2$) was isolated by filtration. The filtered manganese hydroxide was dissolved in an aqueous nitric acid ($HNO_3$) solution of about 65 wt % and diluted with water to produce an aqueous solution containing 170 grams per liter of Mn and less than 0.1 grams per liter of metal impurities. The manganese solution and an ammonium carbonate (($NH_4)_2CO_3$) solution with a specific gravity at 20° C. of about 1.08 were simultaneously fed into a stirred reactor such that the molar ratio of carbonate to manganese was 1.03. The temperature of the reactor was held at 40° C. A precipitate of rhodochrosite comprising manganese carbonate ($MnCO_3$) and an ammonium nitrate ($NH_4NO_3$) reaction solution were formed.

Once steady state conditions were reached, a suspension of the precipitate and the reaction solution was removed from the reactor and was filtered to isolate the precipitate. Residual reaction solution was washed from the precipitate filter cake with water to prepare a washed rhodochrosite.

The washed rhodochrosite filter cake was then dried in air in a spin-flash dryer (Lab Spin-Flash Dryer, model 01.5.47 from APV Anhydro AS) with an inlet temperature of about 250° C. and an outlet temperature of about 100° C. to produce synthetic rhodochrosite that was beige and had a flowability score of 4.

The synthetic rhodochrosite was subjected to the accelerated storage test. The initial oxidation level of the synthetic rhodochrosite was 0.02%. After 4 weeks in the accelerated storage test, the oxidation level of the synthetic rhodochrosite was 0.63%, which is significantly higher than the initial oxidation level of 0.02%, and the synthetic rhodochrosite was brown in color and had a flowability score of 2.

Comparative Example 2

A washed rhodochrosite was prepared as in Comparative Example 1, then re-suspended in water and re-filtered to obtain a double-washed manganese carbonate precipitate filter cake. The double-washed rhodochrosite filter cake was dried in a forced-air oven at a temperature of about 150° C. for 1 hour to produce synthetic rhodochrosite that was beige and had a flowability score of 4.

The synthetic rhodochrosite was subjected to the accelerated storage test. The initial oxidation level of the synthetic rhodochrosite was 0.14%. After 4 weeks in the accelerated storage test, the oxidation level of the synthetic rhodochrosite was 0.78%, which is significantly higher than the initial oxidation level of 0.14%, and the synthetic rhodochrosite was brown in color and had a flowability score of 2.

Comparative Example 3

A double-washed rhodochrosite filter cake having about 11.5 wt % liquid was prepared as described in Comparative Example 2. This double-washed filter cake was displacement-washed on the filter with 0.115 kilograms of water per kilogram of double-washed rhodochrosite or 0.130 kilograms of water per kilogram of rhodochrosite on a dry basis.

The triple-washed rhodochrosite filter cake was then pre-dried for 3 hours in a forced-air oven at 70° C., followed by complete drying at 150° C. for 1 hour in a forced-air oven to produce synthetic rhodochrosite that was beige and had a flowability score of 4.

Five different synthetic rhodochrosite samples were produced in this manner Each of the synthetic rhodochrosite samples was subjected to the accelerated storage test. The average of the initial oxidation level of the synthetic rhodochrosite was 0.17%. After 4 weeks in the accelerated storage test, the average oxidation level of the synthetic rhodochrosite was 0.79% (with a standard deviation of 0.27 percentage points), which is significantly higher than the initial oxidation level of 0.17% (with a standard deviation of 0.03 percentage points), and the synthetic rhodochrosite ranged from light-brown to brown in color and had a flowability score ranging from 2 to 3.

Comparative Example 4

A double-washed rhodochrosite filter cake having about 11.5 wt % liquid was prepared as described in Comparative Example 2 and treated by displacement-washing with an aqueous potassium nitrate ($KNO_3$) treatment solution. The aqueous potassium nitrate ($KNO_3$) treatment solution having about 7.7 grams nitrate ($NO_3^-$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce synthetic rhodochrosite that was beige and had a flowability score of 4. On a calculated basis, the content of nitrate ($NO_3^-$) added to the synthetic rhodochrosite was 0.10 wt %.

The synthetic rhodochrosite was subjected to the accelerated storage test. The initial oxidation level of the synthetic rhodochrosite was 0.15%. After 4 weeks in the accelerated storage test, the oxidation level of the synthetic rhodochrosite was 0.60%, and the synthetic rhodochrosite was brown in color and had a flowability score of 2.

Comparative Example 5

A double-washed rhodochrosite filter cake having about 11.5 wt % liquid was prepared as described in Comparative Example 2 and treated by displacement-washing with an aqueous potassium chloride (KCl) treatment solution. The aqueous potassium chloride (KCl) treatment solution having about 7.7 grams chloride (CO per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce synthetic rhodochrosite that was beige and had a flowability score of 4. On a calculated basis, the content of chloride ($Cl^-$) added to the synthetic rhodochrosite was 0.10 wt %.

The synthetic rhodochrosite was subjected to the accelerated storage test. The initial oxidation level of the synthetic rhodochrosite was 0.13%. After 4 weeks in the accelerated storage test, the oxidation level of the synthetic rhodochrosite was 0.99%, and the synthetic rhodochrosite was dark brown in color and had a flowability score of 1.

Comparative Example 6

A double-washed rhodochrosite filter cake having about 11.5 wt % liquid was prepared as described in Comparative Example 2 and treated by displacement-washing with an aqueous hydrochloric acid (HCl) treatment solution. The aqueous hydrochloric acid (HCl) treatment solution having about 7.7 grams chloride ($Cl^-$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce synthetic rhodochrosite that was beige and had a flowability score of 4. On a calculated basis, the content of chloride ($Cl^-$) added to the synthetic rhodochrosite was 0.10 wt %.

The synthetic rhodochrosite was subjected to the accelerated storage test. The initial oxidation level of the synthetic rhodochrosite was 0.18%. After 4 weeks in the accelerated storage test, the oxidation level of the synthetic rhodochrosite was 0.89%, and the synthetic rhodochrosite was brown in color and had a flowability score of 2-3.

Comparative Example 7

A double-washed rhodochrosite filter cake having about 11.5 wt % liquid was prepared as described in Comparative Example 2 and treated by displacement-washing with an aqueous nitric acid (HNO$_3$) treatment solution. The aqueous nitric acid (HNO$_3$) treatment solution having about 7.7 grams nitrate (NO$_3^-$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce synthetic rhodochrosite that was beige and had a flowability score of 4. On a calculated basis, the content of nitrate (NO$_3^-$) added to the synthetic rhodochrosite was 0.10 wt %.

The synthetic rhodochrosite was subjected to the accelerated storage test. The initial oxidation level of the synthetic rhodochrosite was 0.17%. After 4 weeks in the accelerated storage test, the oxidation level of the synthetic rhodochrosite 0.88%, and the synthetic rhodochrosite was brown in color and had a flowability score of 2-3.

Comparative Example 8

A double-washed rhodochrosite filter cake having about 11.5 wt % liquid was prepared as described in Comparative Example 2 and treated by displacement-washing with an aqueous boric acid (H$_3$BO$_3$) treatment solution. The aqueous boric acid (H$_3$BO$_3$) treatment solution having about 7.7 grams borate (BO$_3^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying at 150° C. for 1 hour in a forced-air oven to produce synthetic rhodochrosite that was beige and had a flowability score of 4. On a calculated basis, the content of borate (BO$_3^{3-}$) added to the synthetic rhodochrosite was 0.10 wt %.

The synthetic rhodochrosite was subjected to the accelerated storage test. The initial oxidation level of the synthetic rhodochrosite was 0.21%. After 4 weeks in the accelerated storage test, the oxidation level of the synthetic rhodochrosite was 0.89%, and the synthetic rhodochrosite was brown in color and had a flowability score of 2-3.

Inventive Example 1

A double-washed rhodochrosite filter cake having about 18.8 wt % liquid was prepared as described in Comparative Example 2 and treated by displacement-washing with an aqueous phosphoric acid (H$_3$PO$_4$) treatment solution. The aqueous phosphoric acid (H$_3$PO$_4$) treatment solution having about 4.3 grams phosphate (PO$_4^{3-}$) per kilogram was poured directly on the rhodochrosite filter cake. 0.23 kilograms of treatment solution per kilogram of rhodochrosite on a dried basis was used. The treated rhodochrosite was then dried in a forced-air oven at a temperature of about 150° C. for 1 hour to produce stable synthetic rhodochrosite that was beige and had a flowability score of 4. On a calculated basis, the content of phosphate (PO$_4^{3-}$) added to the stable synthetic rhodochrosite was 0.10 wt %.

The stable synthetic rhodochrosite was subjected to the accelerated storage test. The initial oxidation level of the stable synthetic rhodochrosite was 0.07%. After 4 weeks in the accelerated storage test, the oxidation level of the stable synthetic rhodochrosite was 0.10%, and the stable synthetic rhodochrosite was beige in color and had a flowability score of 4.

Inventive Example 2

A washed rhodochrosite filter cake was prepared as in Comparative Example 1, and treated with an aqueous phosphoric acid (H$_3$PO$_4$) treatment solution. The aqueous phosphoric acid (H$_3$PO$_4$) treatment solution having about 50 grams phosphate (PO$_4^{3-}$) per liter was sprayed directly on the washed rhodochrosite filter cake. 0.01 liters of treatment solution per kilogram of rhodochrosite on a dried basis was used. The treated rhodochrosite was then dried in a forced-air oven at a temperature about 180° C. for 0.75 hour to produce stable synthetic rhodochrosite that was beige and had a flowability score of 4. On a calculated basis, the content of phosphate (PO$_4^{3-}$) added to the stable synthetic rhodochrosite was 0.05 wt %.

The stable synthetic rhodochrosite was subjected to the accelerated storage test. The initial oxidation level of the stable synthetic rhodochrosite was 0.03%. After 4 weeks in the accelerated storage test, the oxidation level of the stable synthetic rhodochrosite was 0.13%, and the stable synthetic rhodochrosite was beige in color and had a flowability score of 4.

Inventive Example 3

A washed rhodochrosite filter cake having about 18 wt % liquid was prepared as in Comparative Example 1. 134.1 grams of the washed rhodochrosite filter cake was placed into a 250 milliliter plastic container for treatment. To this sample, 2 milliliters of a treatment solution containing phosphoric acid (H$_3$PO$_4$) having about 70 grams phosphate (PO$_4^{3-}$) per liter was added in 10 increments 200 microliters each. Between additions, the container was shaken manually. When all the treatment solution had been added, the container was placed in a 3D mixer (WAB Turbula T2F) and mixed for 15 minutes. The treated rhodochrosite was then dried in a forced-air oven at a temperature of about 150° C. for 1 hour to produce stable synthetic rhodochrosite that was beige and had a flowability score of 4. On a calculated basis, the content of phosphate (PO$_4^{3-}$) added to the stable synthetic rhodochrosite was 0.13 wt %.

The stable synthetic rhodochrosite was subjected to the accelerated storage test. The initial oxidation level of the stable synthetic rhodochrosite was 0.10%. After 4 weeks in the accelerated storage test, the oxidation level of the stable synthetic rhodochrosite was 0.19%, and the stable synthetic rhodochrosite was beige in color and had a flowability score of 4.

Inventive Example 4

A washed rhodochrosite filter cake was prepared as in Comparative Example 1 and treated with an aqueous citric acid (C$_6$H$_8$O$_7$) treatment solution. The aqueous citric acid (C$_6$H$_8$O$_7$) treatment solution having about 200 grams citrate (C$_6$H$_5$O$_7^{3-}$) per liter was sprayed directly on the rhodochrosite filter cake. 0.01 liter of treatment solution per kilogram of rhodochrosite on a dried basis was used. The treated rhodochrosite was then dried in a forced-air oven at a temperature of about 150° C. for 1 hour to produce stable synthetic rhodochrosite that was beige and had a flowability score of 4. On a calculated basis, the content of citrate (C$_6$H$_5$O$_7^{3-}$) added to the stable synthetic rhodochrosite was 0.20 wt %.

The stable synthetic rhodochrosite was subjected to the accelerated storage test. The initial oxidation level of the stable synthetic rhodochrosite was 0.08%. After 4 weeks in the accelerated storage test, the oxidation level of the stable synthetic rhodochrosite was 0.13%, and the stable synthetic rhodochrosite was beige in color and had a flowability score of 4.

Inventive Example 5

A double-washed rhodochrosite filter cake having about 24 wt % liquid was prepared as described in Comparative Example 2 and treated by displacement-washing with an aqueous citric acid ($C_6H_8O_7$) treatment solution. The aqueous citric acid ($C_6H_8O_7$) treatment solution having about 7.8 grams citrate ($C_6H_5O_7^{3-}$) per kilogram was poured directly on the rhodochrosite filter cake. 0.33 kilograms of treatment solution per kilogram of rhodochrosite on a dried basis was used. The treated rhodochrosite was then dried in air in a spin-flash dryer (Lab Spin-Flash Dryer, model 01.5.47 from APV Anhydro AS) with an inlet temperature of about 250° C. and an outlet temperature of about 100° C. to produce stable synthetic rhodochrosite that was beige and had a flowability score of 4. On a calculated basis, the content of citrate ($C_6H_5O_7^{3-}$) added to the stable synthetic rhodochrosite was 0.25 wt %.

The stable synthetic rhodochrosite was subjected to the accelerated storage test. The initial oxidation level of the stable synthetic rhodochrosite was 0.03%. After 4 weeks in the accelerated storage test, the oxidation level of the stable synthetic rhodochrosite was 0.12%, and the stable synthetic rhodochrosite was beige in color and had a flowability score of 4.

Inventive Example 6

A washed rhodochrosite filter cake having about 21.4 wt % liquid was prepared as in Comparative Example 1. 140 grams of the washed rhodochrosite filter cake were placed into a 250 milliliter plastic container for treatment. To this sample, 2 milliliters of a treatment solution containing phosphoric acid ($H_3PO_4$) having about 28.4 grams phosphate ($PO_4^{3-}$) per liter was added in 10 increments 200 microliters each. Between additions, the container was shaken manually. When all the treatment solution had been added, the container was placed in a 3D mixer (WAB Turbula T2F) and mixed for 15 minutes. The treated rhodochrosite was then dried in a forced-air oven at a temperature of about 150° C. for 1 hour to produce stable synthetic rhodochrosite that was beige and had a flowability score of 4. On a calculated basis, the content of phosphate ($PO_4^{3-}$) added to the stable synthetic rhodochrosite was 0.05 wt %.

The stable synthetic rhodochrosite was subjected to the accelerated storage test. The initial oxidation level of the stable synthetic rhodochrosite was 0.09%. After 4 weeks in the accelerated storage test, the oxidation level of the stable synthetic rhodochrosite was 0.15%, and the stable synthetic rhodochrosite was beige in color and had a flowability score of 4.

Inventive Example 7

A washed rhodochrosite filter cake having about 21.4 wt % liquid was prepared as in Comparative Example 1. 140 grams of the washed rhodochrosite filter cake were placed into a 250 milliliter plastic container for treatment. To this sample, 2 milliliters of a treatment solution containing phosphoric acid ($H_3PO_4$) having about 141.9 grams per liter phosphate ($PO_4^{3-}$) was added in 10 increments 200 microliters each. Between additions, the container was shaken manually. When all the treatment solution had been added, the container was placed in a 3D mixer (WAB Turbula T2F) and mixed for 15 minutes. The treated rhodochrosite was then dried in a forced-air oven at a temperature of about 150° C. for 1 hour to produce stable synthetic rhodochrosite that was beige and had a flowability score of 4. On a calculated basis, the content of phosphate ($PO_4^{3-}$) added to the stable synthetic rhodochrosite was 0.26 wt %.

The stable synthetic rhodochrosite was subjected to the accelerated storage test. The initial oxidation level of the stable synthetic rhodochrosite was 0.10%. After 4 weeks in the accelerated storage test, the oxidation level of the stable synthetic rhodochrosite was 0.14%, and the stable synthetic rhodochrosite was beige in color and had a flowability score of 4.

Inventive Example 8

A double-washed rhodochrosite filter cake having about 11.5 wt % liquid was prepared as described in Comparative Example 2 and treated by displacement-washing with an aqueous phosphoric acid ($H_3PO_4$) treatment solution. The aqueous phosphoric acid ($H_3PO_4$) treatment solution having about 7.7 grams phosphate ($PO_4^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of phosphate ($PO_4^{3-}$) added to the stable synthetic rhodochrosite was 0.10 wt %.

The stable synthetic rhodochrosite was subjected to the accelerated storage test. The initial oxidation level of the stable synthetic rhodochrosite was 0.13%. After 4 weeks in the accelerated storage test, the oxidation level of the stable synthetic rhodochrosite was 0.17%, and the stable synthetic rhodochrosite was beige in color and had a flowability score of 4.

Inventive Example 9

A double-washed rhodochrosite filter cake having about 11.5 wt % liquid was prepared as described in Comparative Example 2 and treated by displacement-washing with an aqueous di-sodium phosphate ($Na_2HPO_4$) treatment solution. The aqueous di-sodium phosphate ($Na_2HPO_4$) treatment solution having about 7.7 grams phosphate ($PO_4^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of phosphate ($PO_4^{3-}$) added to the stable synthetic rhodochrosite was 0.10 wt %.

The stable synthetic rhodochrosite was subjected to the accelerated storage test. The initial oxidation level of the stable synthetic rhodochrosite was 0.13%. After 4 weeks in the accelerated storage test, the oxidation level of the stable synthetic rhodochrosite was 0.17%, and the stable synthetic rhodochrosite was beige in color and had a flowability score of 4.

Inventive Example 10

A double-washed rhodochrosite filter cake having about 11.5 wt % liquid was prepared as described in Comparative Example 2 and treated by displacement-washing with an aqueous mono-sodium phosphate ($NaH_2PO_4$) treatment solution. The aqueous mono-sodium phosphate ($NaH_2PO_4$) treatment solution having about 7.7 grams phosphate ($PO_4^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of phosphate ($PO_4^{3-}$) added to the stable synthetic rhodochrosite was 0.10 wt %.

The stable synthetic rhodochrosite was subjected to the accelerated storage test. The initial oxidation level of the stable synthetic rhodochrosite was 0.13%. After 4 weeks in the accelerated storage test, the oxidation level of the stable synthetic rhodochrosite was 0.17%, and the stable synthetic rhodochrosite was beige in color and had a flowability score of 4.

Inventive Example 11

A double-washed rhodochrosite filter cake having about 11.5 wt % liquid was prepared as described in Comparative Example 2 and treated by displacement-washing with an aqueous tri-sodium phosphate ($Na_3PO_4$) treatment solution. The aqueous tri-sodium phosphate ($Na_3PO_4$) treatment solution having about 7.7 grams phosphate ($PO_4^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of phosphate ($PO_4^{3-}$) added to the stable synthetic rhodochrosite was 0.10 wt %.

The stable synthetic rhodochrosite was subjected to the accelerated storage test. The initial oxidation level of the stable synthetic rhodochrosite was 0.13%. After 4 weeks in the accelerated storage test, the oxidation level of the stable synthetic rhodochrosite was 0.17%, and the stable synthetic rhodochrosite was beige in color and had a flowability score of 4.

Inventive Example 12

A double-washed rhodochrosite filter cake having about 11.5 wt % liquid was prepared as described in Comparative Example 2 and treated by displacement-washing with an aqueous tetra-sodium pyrophosphate ($Na_4P_2O_7$) treatment solution. The aqueous tetra-sodium pyrophosphate ($Na_4P_2O_7$) treatment solution having about 7.7 grams pyrophosphate ($P_2O_7^{4-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of pyrophosphate ($P_2O_7^{4-}$) added to the stable synthetic rhodochrosite was 0.10 wt %.

The stable synthetic rhodochrosite was subjected to the accelerated storage test. The initial oxidation level of the stable synthetic rhodochrosite was 0.14%. After 4 weeks in the accelerated storage test, the oxidation level of the stable synthetic rhodochrosite was 0.18%, and the stable synthetic rhodochrosite was beige in color and had a flowability score of 4.

Inventive Example 13

A double-washed rhodochrosite filter cake having about 11.5 wt % liquid was prepared as described in Comparative Example 2 and treated by displacement-washing with an aqueous citric acid ($C_6H_8O_7$) treatment solution. The aqueous citric acid ($C_6H_8O_7$) treatment solution having about 7.7 grams citrate ($C_6H_5O_7^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of citrate ($C_6H_5O_7^{3-}$) added to the stable synthetic rhodochrosite was 0.10 wt %.

The stable synthetic rhodochrosite was subjected to the accelerated storage test. The initial oxidation level of the stable synthetic rhodochrosite was 0.16%. After 4 weeks in the accelerated storage test, the oxidation level of the stable synthetic rhodochrosite was 0.43%, and the stable synthetic rhodochrosite was beige in color and had a flowability score of 4.

Inventive Example 14

A double-washed rhodochrosite filter cake having about 11.5 wt % liquid was prepared as described in Comparative Example 2 and treated by displacement-washing with an aqueous mono-sodium citrate ($C_6H_7NaO_7$) treatment solution. The aqueous mono-sodium citrate ($C_6H_7NaO_7$) treatment solution having about 7.7 grams citrate ($C_6H_5O_7^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying at 150° C. for 1 hour in a forced-air oven to produce stable synthetic rhodochrosite that was beige and had a flowability score of 4. On a calculated basis, the content of citrate ($C_6H_5O_7^{3-}$) added to the stable synthetic rhodochrosite was 0.10 wt %.

The stable synthetic rhodochrosite was subjected to the accelerated storage test. The initial oxidation level of the stable synthetic rhodochrosite was 0.18%. After 4 weeks in the accelerated storage test, the oxidation level of the stable synthetic rhodochrosite was 0.46%, and the stable synthetic rhodochrosite was beige in color and had a flowability score of 4.

Inventive Example 15

A double-washed rhodochrosite filter cake having about 11.5 wt % liquid was prepared as described in Comparative Example 2 and treated by displacement-washing with an aqueous tri-sodium citrate ($Na_3C_6H_5O_7$) treatment solution. The aqueous tri-sodium citrate ($Na_3C_6H_5O_7$) treatment solution having about 7.7 grams citrate ($C_6H_5O_7^{3-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of citrate ($C_6H_5O_7^{3-}$) added to the stable synthetic rhodochrosite was 0.10 wt %.

The stable synthetic rhodochrosite was subjected to the accelerated storage test. The initial oxidation level of the stable synthetic rhodochrosite was 0.18%. After 4 weeks in the accelerated storage test, the oxidation level of the stable synthetic rhodochrosite was 0.53%, and the stable synthetic rhodochrosite was beige in color and had a flowability score of 4.

Inventive Example 16

A double-washed rhodochrosite filter cake having about 11.5 wt % liquid was prepared as described in Comparative Example 2 and treated by displacement-washing with an aqueous potassium sulfate ($K_2SO_4$) treatment solution. The aqueous potassium sulfate ($K_2SO_4$) treatment solution having about 7.7 grams sulfate ($SO_4^{2-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of sulfate ($SO_4^{2-}$) added to the stable synthetic rhodochrosite was 0.10 wt %.

The stable synthetic rhodochrosite was subjected to the accelerated storage test. The initial oxidation level of the stable synthetic rhodochrosite was 0.17%. After 4 weeks in the accelerated storage test, the oxidation level of the stable synthetic rhodochrosite was 0.48%, and the stable synthetic rhodochrosite was beige in color and had a flowability score of 4.

Inventive Example 17

A double-washed rhodochrosite filter cake having about 11.5 wt % liquid was prepared as described in Comparative Example 2 and treated by displacement-washing with an aqueous sulfuric acid ($H_2SO_4$) treatment solution. The aqueous sulfuric acid ($H_2SO_4$ treatment solution having about 7.7 grams sulfate ($SO_4^{2-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of sulfate ($SO_4^{2-}$) added to the stable synthetic rhodochrosite was 0.10 wt %.

The stable synthetic rhodochrosite was subjected to the accelerated storage test. The initial oxidation level of the stable synthetic rhodochrosite was 0.16%. After 4 weeks in the accelerated storage test, the oxidation level of the stable synthetic rhodochrosite was 0.40%, and the stable synthetic rhodochrosite was beige in color and had a flowability score of 4.

Inventive Example 18

A double-washed rhodochrosite filter cake having about 11.5 wt % liquid was prepared as described in Comparative Example 2 and treated by displacement-washing with an aqueous di-sodium oxalate ($Na_2C_2O_4$) treatment solution. The aqueous di-sodium oxalate ($Na_2C_2O_4$) treatment solution having about 7.7 grams oxalate ($C_2O_4^{2-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of oxalate ($C_2O_4^{2-}$) added to the stable synthetic rhodochrosite was 0.10 wt %.

The stable synthetic rhodochrosite was subjected to the accelerated storage test. The initial oxidation level of the stable synthetic rhodochrosite was 0.10%. After 4 weeks in the accelerated storage test, the oxidation level of the stable synthetic rhodochrosite was 0.27%, and the stable synthetic rhodochrosite was beige in color and had a flowability score of 4.

Inventive Example 19

A double-washed rhodochrosite filter cake having about 11.5 wt % liquid was prepared as described in Comparative Example 2 and treated by displacement-washing with an aqueous potassium acetate ($KCH_3COO$) treatment solution. The aqueous potassium acetate ($KCH_3COO$) treatment solution having about 7.7 grams acetate ($C_2H_3O_2^-$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of acetate ($C_2H_3O_2^-$) added to the stable synthetic rhodochrosite was 0.10 wt %.

The stable synthetic rhodochrosite was subjected to the accelerated storage test. The initial oxidation level of the stable synthetic rhodochrosite was 0.13%. After 4 weeks in the accelerated storage test, the oxidation level of the stable synthetic rhodochrosite was 0.24%, and the stable synthetic rhodochrosite was beige in color and had a flowability score of 4.

Inventive Example 20

A double-washed rhodochrosite filter cake having about 11.5 wt % liquid was prepared as described in Comparative Example 2 and treated by displacement-washing with an aqueous mono-potassium tartrate ($C_4H_5KO_6$) treatment solution. The aqueous mono-potassium tartrate ($C_4H_5KO_6$) treatment solution having about 7.7 grams tartrate ($C_4H_4O_6^{2-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of tartrate ($C_4H_4O_6^{2-}$) added to the stable synthetic rhodochrosite was 0.10 wt %.

The stable synthetic rhodochrosite was subjected to the accelerated storage test. The initial oxidation level of the stable synthetic rhodochrosite was 0.14%. After 4 weeks in the accelerated storage test, the oxidation level of the stable synthetic rhodochrosite was 0.27%, and the stable synthetic rhodochrosite was beige in color and had a flowability score of 4.

Inventive Example 21

A double-washed rhodochrosite filter cake having about 11.5 wt % liquid was prepared as described in Comparative Example 2 and treated by displacement-washing with an aqueous tri-potassium ethylenediaminetetraacetic acid (tri-potassium EDTA, $C_{10}H_{13}K_3N_2O_8$) treatment solution. The aqueous tri-potassium ethylenediaminetetraacetic acid (tri-potassium EDTA, $C_{10}H_{13}K_3N_2O_8$) treatment solution having about 7.7 grams of the ligand of ethylenediaminetetraacetic acid ($[C_{10}H_{12}N_2O_8]^{4-}$) per kilogram was poured directly on the rhodochrosite filter cake. 0.13 kilograms of treatment solution per kilogram of rhodochrosite on a dried basis was used. The treated rhodochrosite was then pre-dried for 3 hours in a forced-air oven at 70° C., followed by complete drying in a forced-air oven at 150° C. for 1 hour to produce stable synthetic rhodochrosite that was beige and had a flowability score of 4. On a calculated basis, the content of the ligand of ethylenediaminetetraacetic acid ($[C_{10}H_{12}N_2O_8]^{4-}$) added to the stable synthetic rhodochrosite was 0.10 wt %.

The stable synthetic rhodochrosite was subjected to the accelerated storage test. The initial oxidation level of the stable synthetic rhodochrosite was 0.12%. After 4 weeks in the accelerated storage test, the oxidation level of the stable synthetic rhodochrosite was 0.26%, and the stable synthetic rhodochrosite was beige in color and had a flowability score of 4.

TABLE 1

Sample Preparation

| | | Treatment Solution | | | | Drying | | |
|---|---|---|---|---|---|---|---|---|
| | Washing After Precipitation | Type | Conc. (g/kg or l) | Amount (kg or l) per kg of synthetic rhodochrosite on a dried basis | Treatment Type | Type | Temp. (° C.) | Time (hr) |
| Comparative Example 1 | Single | None | None | None | None | Spin-flash | Entry - 250 Exit - 100 | — |
| Comparative Example 2 | Double | None | None | None | None | Forced Air | 150 | 1 |
| Comparative Example 3 | Triple | None | None | None | None | Forced Air | 70; then 150 | 3 + 1 |
| Comparative Example 4 | Double | Potassium Nitrate ($KNO_3$) | 7.7 g/kg | 0.13 kg | Displacement wash | Forced Air | 70; then 150 | 3 + 1 |
| Comparative Example 5 | Double | Potassium Chloride (KCl) | 7.7 g/kg | 0.13 kg | Displacement wash | Forced Air | 70; then 150 | 3 + 1 |
| Comparative Example 6 | Double | Hydrochloric Acid (HCl) | 7.7 g/kg | 0.13 kg | Displacement wash | Forced Air | 70; then 150 | 3 + 1 |
| Comparative Example 7 | Double | Nitric Acid ($HNO_3$) | 7.7 g/kg | 0.13 kg | Displacement wash | Forced Air | 70; then 150 | 3 + 1 |
| Comparative Example 8 | Double | Boric Acid ($H_3BO_3$) | 7.7 g/kg | 0.13 kg | Displacement wash | Forced Air | 70; then 150 | 3 + 1 |
| Inventive Example 1 | Double | Phosphoric Acid ($H_3PO_4$) | 4.3 g/kg | 0.23 kg | Displacement wash | Forced Air | 150 | 1 |
| Inventive Example 2 | Single | Phosphoric Acid ($H_3PO_4$) | 50 g/l | 0.01 l | Spray | Forced Air | 180 | 0.75 |
| Inventive Example 3 | Single | Phosphoric Acid ($H_3PO_4$) | 70 g/l | 0.018 l | Mixer | Forced Air | 150 | 1 |
| Inventive Example 4 | Double | Citric Acid ($C_6H_8O_7$) | 200 g/l | 0.01 l | Spray | Forced Air | 150 | 1 |
| Inventive Example 5 | Double | Citric Acid ($C_6H_8O_7$) | 7.8 g/kg | 0.33 kg | Displacement wash | Spin Flash | Entry - 250 Exit - 100 | — |
| Inventive Example 6 | Double | Phosphoric Acid ($H_3PO_4$) | 28.4 g/l | 0.18 l | Mixer | Forced Air | 150 | 1 |
| Inventive Example 7 | Double | Phosphoric Acid ($H_3PO_4$) | 141.9 g/l | 0.18 l | Mixer | Forced Air | 150 | 1 |
| Inventive Example 8 | Double | Phosphoric Acid ($H_3PO_4$) | 7.7 g/kg | 0.13 kg | Displacement wash | Forced Air | 70; then 150 | 3 + 1 |
| Inventive Example 9 | Double | Di-sodium Phosphate ($Na_2HPO_4$) | 7.7 g/kg | 0.13 kg | Displacement wash | Forced Air | 70; then 150 | 3 + 1 |
| Inventive Example 10 | Double | Mono-sodium Phosphate ($NaH_2PO_4$) | 7.7 g/kg | 0.13 kg | Displacement wash | Forced Air | 70; then 150 | 3 + 1 |
| Inventive Example 11 | Double | Tri-sodium Phosphate ($Na_3PO_4$) | 7.7 g/kg | 0.13 kg | Displacement wash | Forced Air | 70; then 150 | 3 + 1 |
| Inventive Example 12 | Double | Tetra-sodium Pyrophosphate ($Na_4P_2O_7$) | 7.7 g/kg | 0.13 kg | Displacement wash | Forced Air | 70; then 150 | 3 + 1 |
| Inventive Example 13 | Double | Citric Acid ($C_6H_8O_7$) | 7.7 g/kg | 0.13 kg | Displacement wash | Forced Air | 70; then 150 | 3 + 1 |
| Inventive Example 14 | Double | Mono-sodium Citrate ($C_6H_7NaO_7$) | 7.7 g/kg | 0.13 kg | Displacement wash | Forced Air | 70; then 150 | 3 + 1 |
| Inventive Example 15 | Double | Tri-sodium Citrate ($Na_3C_6H_5O_7$) | 7.7 g/kg | 0.13 kg | Displacement wash | Forced Air | 70; then 150 | 3 + 1 |
| Inventive Example 16 | Double | Potassium sulfate ($K_2SO_4$) | 7.7 g/kg | 0.13 kg | Displacement wash | Forced Air | 70; then 150 | 3 + 1 |

TABLE 1-continued

Sample Preparation

| | Washing After Precipitation | Treatment Solution Type | Conc. (g/kg or l) | Amount (kg or l) per kg of synthetic rhodochrosite on a dried basis | Treatment Type | Drying Type | Temp. (° C.) | Time (hr) |
|---|---|---|---|---|---|---|---|---|
| Inventive Example 17 | Double | Sulfuric Acid ($H_2SO_4$) | 7.7 g/kg | 0.13 kg | Displacement wash | Forced Air | 70; then 150 | 3 + 1 |
| Inventive Example 18 | Double | Di-sodium Oxalate ($Na_2C_2O_4$) | 7.7 g/kg | 0.13 kg | Displacement wash | Forced Air | 70; then 150 | 3 + 1 |
| Inventive Example 19 | Double | Potassium Acetate ($KCH_3COO$) | 7.7 g/kg | 0.13 kg | Displacement wash | Forced Air | 70; then 150 | 3 + 1 |
| Inventive Example 20 | Double | Mono-potassium tartrate ($C_4H_5KO_6$) | 7.7 g/kg | 0.13 kg | Displacement wash | Forced Air | 70; then 150 | 3 + 1 |
| Inventive Example 21 | Double | Tri-potassium Ethylenediaminetetraacetic acid | 7.7 g/kg | 0.13 kg | Displacement wash | Forced Air | 70; then 150 | 3 + 1 |

TABLE 2

Product Characteristics

| Sample | Anion or Ligand | Concentration (wt %) | Oxidation Level (% $MnO_2$) Initially | Oxidation Level (% $MnO_2$) Week 4 | Oxidation Level (% $MnO_2$) Increase | Color Week 4 | Flowability Week 4 |
|---|---|---|---|---|---|---|---|
| Comparative Example 1 | n/a | n/a | 0.02 | 0.63 | 0.61 | Brown | 2 |
| Comparative Example 2 | n/a | n/a | 0.14 | 0.78 | 0.64 | Brown | 2 |
| Comparative Example 3 | n/a | n/a | 0.17 | 0.79 | 0.62 | Light brown to Brown | 2-3 |
| Comparative Example 4 | Nitrate | 0.10 | 0.15 | 0.60 | 0.45 | Brown | 2 |
| Comparative Example 5 | Chloride | 0.10 | 0.13 | 0.99 | 0.86 | Dark brown | 1 |
| Comparative Example 6 | Chloride | 0.10 | 0.18 | 0.89 | 0.71 | Brown | 2-3 |
| Comparative Example 7 | Nitrate | 0.10 | 0.17 | 0.88 | 0.71 | Brown | 2-3 |
| Comparative Example 8 | Borate | 0.10 | 0.21 | 0.89 | 0.68 | Brown | 2-3 |
| Inventive Example 1 | Phosphate | 0.10 | 0.07 | 0.10 | 0.03 | Beige | 4 |
| Inventive Example 2 | Phosphate | 0.05 | 0.03 | 0.13 | 0.10 | Beige | 4 |
| Inventive Example 3 | Phosphate | 0.13 | 0.10 | 0.19 | 0.09 | Beige | 4 |
| Inventive Example 4 | Citrate | 0.20 | 0.08 | 0.13 | 0.05 | Beige | 4 |
| Inventive Example 5 | Citrate | 0.25 | 0.03 | 0.12 | 0.09 | Beige | 4 |
| Inventive Example 6 | Phosphate | 0.05 | 0.09 | 0.15 | 0.06 | Beige | 4 |
| Inventive Example 7 | Phosphate | 0.26 | 0.10 | 0.14 | 0.04 | Beige | 4 |
| Inventive Example 8 | Phosphate | 0.10 | 0.13 | 0.17 | 0.04 | Beige | 4 |
| Inventive Example 9 | Phosphate | 0.10 | 0.13 | 0.17 | 0.04 | Beige | 4 |
| Inventive Example 10 | Phosphate | 0.10 | 0.13 | 0.17 | 0.04 | Beige | 4 |
| Inventive Example 11 | Phosphate | 0.10 | 0.13 | 0.17 | 0.04 | Beige | 4 |
| Inventive Example 12 | Pyrophosphate | 0.10 | 0.14 | 0.18 | 0.04 | Beige | 4 |
| Inventive Example 13 | Citrate | 0.10 | 0.16 | 0.43 | 0.27 | Beige | 4 |
| Inventive Example 14 | Citrate | 0.10 | 0.18 | 0.46 | 0.28 | Beige | 4 |
| Inventive Example 15 | Citrate | 0.10 | 0.18 | 0.53 | 0.35 | Beige | 4 |
| Inventive Example 16 | Sulfate | 0.10 | 0.17 | 0.48 | 0.31 | Beige | 4 |
| Inventive Example 17 | Sulfate | 0.10 | 0.16 | 0.40 | 0.24 | Beige | 4 |
| Inventive Example 18 | Oxalate | 0.10 | 0.10 | 0.27 | 0.17 | Beige | 4 |
| Inventive Example 19 | Acetate | 0.10 | 0.13 | 0.24 | 0.11 | Beige | 4 |
| Inventive Example 20 | Tartrate | 0.10 | 0.14 | 0.27 | 0.13 | Beige | 4 |
| Inventive Example 21 | $[EDTA]^{4-}$ | 0.10 | 0.12 | 0.26 | 0.14 | Beige | 4 |

As can be seen in Table 2, the oxidation of the stable synthetic rhodochrosite treated according to the invention increases 0.03-0.35% after 4 weeks in accelerated storage while the oxidation of the synthetic rhodochrosite that is not treated according to the invention increases 0.45-0.86% after 4 weeks in accelerated storage. In addition, the color and the flowability of the stable synthetic rhodochrosite treated according to the invention remains the same after 4 weeks in accelerated storage while the color and the flowability of the synthetic rhodochrosite that is not treated according to the invention changes after 4 weeks in accelerated storage. Thus, the properties of the stable synthetic rhodochrosite, which is less susceptible to oxidation, are not deteriorated during storage in the same manner as the prior art synthetic rhodochrosite.

The present invention is also directed to the following clauses.

Clause 1: A stable rhodochrosite comprising manganese carbonate ($MnCO_3$) and 0.03-0.3 wt % of an anion or ligand of phosphoric acid ($H_3PO_4$), pyrophosphoric acid ($H_4P_2O_7$), an organic acid, or a salt of such acids, or 0.03-0.3 wt % of a mixture of such anions and/or ligands.

Clause 2: The stable rhodochrosite of clause 1, wherein the anion or ligand comprises phosphate ($PO_4^{3-}$), pyrophosphate ($P_2O_7^{4-}$), citrate ($C_6H_5O_7^{3-}$), oxalate ($C_2O_4^{2-}$), acetate ($C_2H_3O_2^-$), tartrate ($C_4H_4O_6^{2-}$), and/or the ligand of ethylenediaminetetracetic acid ($[EDTA]^{4-}$).

Clause 3: The stable rhodochrosite of any one of clauses 1 or 2, wherein the organic acid comprises citric acid ($C_6H_8O_7$), oxalic acid ($C_2H_2O_4$), acetic acid ($C_2H_4O_2$), tartaric acid ($C_4H_6O_6$), and/or ethylenediaminetetraacetic acid ($C_{10}H_{16}N_2O_8$).

Clause 4: The stable rhodochrosite of any one of clauses 1-3, wherein the salt comprises mono-sodium phosphate ($NaH_2PO_4$), di-sodium phosphate ($Na_2HPO_4$), tri-sodium phosphate ($Na_3PO_4$), tetra-sodium phosphate ($Na_4P_2O_7$), mono-sodium citrate ($C_6H_7NaO_7$), di-sodium citrate ($C_6H_6Na_2O_7$), tri-sodium citrate ($Na_3C_6H_5O_7$), di-sodium oxalate ($Na_2C_2O_4$), mono-potassium acetate ($KCH_3COO$), mono-potassium tartrate ($C_4H_5KO_6$), and/or tri-potassium ethylenediaminetetraacetic acid (tri-potassium EDTA, $C_{10}H_{13}K_3N_2O_8$).

Clause 5: A method of producing stable rhodochrosite comprising manganese carbonate ($MnCO_3$), the method comprising: providing a rhodochrosite comprising manganese carbonate ($MnCO_3$); treating the rhodochrosite by applying an aqueous treatment solution of phosphoric acid ($H_3PO_4$), pyrophosphoric acid ($H_4P_2O_7$), sulfuric acid ($H_2SO_4$), an organic acid, or a salt of such acids, or a mixture thereof to the provided rhodochrosite to form a treated rhodochrosite; and drying the treated rhodochrosite to produce stable rhodochrosite.

Clause 6: The method of clause 5, wherein the provided rhodochrosite comprises a manganese carbonate ($MnCO_3$) precipitate and liquid and the application of the aqueous treatment solution comprises displacing the liquid contained in the rhodochrosite with an approximately equal amount of treatment solution.

Clause 7: The method of any one of clauses 5 or 6, wherein the aqueous treatment solution is sprayed on the rhodochrosite.

Clause 8: The method of any one of clauses 5-7, wherein the aqueous treatment solution is mixed with the rhodochrosite in a blender.

Clause 9: The method of any one of clauses 5-8, wherein the aqueous treatment solution applied to the rhodochrosite comprises 0.3-3.0 grams of anions and/or ligands of the phosphoric acid ($H_3PO_4$), pyrophosphoric acid ($H_4P_2O_7$), sulfuric acid ($H_2SO_4$), organic acids, or salts of such acids for each 1000 grams, on a dried basis, of rhodochrosite that is being treated.

Clause 10: The method of clause 9, wherein the anion or ligand comprises phosphate ($PO_4^{3-}$), pyrophosphate ($P_2O_7^{4-}$), sulfate ($SO_4^{2-}$), citrate ($C_6H_5O_7^{3-}$), oxalate ($C_2O_4^{2-}$), acetate ($C_2H_3O_2^-$), tartrate ($C_4H_4O_6^{2-}$), and/or the ligand of ethylenediaminetetracetic acid ($[EDTA]^{4-}$).

Clause 11: The method of any one of clauses 5-10, wherein the organic acid comprises citric acid ($C_6H_8O_7$), oxalic acid ($C_2H_2O_4$), acetic acid ($C_2H_4O_2$), tartaric acid ($C_4H_6O_6$), and/or ethylenediaminetetraacetic acid ($C_{10}H_{16}N_2O_8$).

Clause 12: The method of any one of clauses 5-11, wherein the salt comprises mono-sodium phosphate ($NaH_2PO_4$), di-sodium phosphate ($Na_2HPO_4$), tri-sodium phosphate ($Na_3PO_4$), tetra-sodium phosphate ($Na_4P_2O_7$), mono-sodium citrate ($C_6H_7NaO_7$), di-sodium citrate ($C_6H_6Na_2O_7$), tri-sodium citrate ($Na_3C_6H_5O_7$), potassium sulfate ($K_2SO_4$), di-sodium oxalate ($Na_2C_2O_4$), mono-potassium acetate ($KCH_3COO$), mono-potassium tartrate ($C_4H_5KO_6$), and/or tri-potassium ethylenediaminetetraacetic acid (tri-potassium EDTA, $C_{10}H_{13}K_3N_2O_8$).

Clause 13: The method of any one of clauses 5-12, wherein the provided rhodochrosite comprises a manganese carbonate ($MnCO_3$) precipitate obtained by mixing a solution comprising Mn with a solution containing carbonate from which a manganese carbonate ($MnCO_3$) precipitates and a reaction solution is formed.

Clause 14: The method of clause 13, wherein the manganese carbonate ($MnCO_3$) precipitate has been substantially separated from the reaction solution but still contains residual reaction solution.

Clause 15: The method according to clause 14, wherein the manganese carbonate ($MnCO_3$) precipitate has been washed at least once with water to dilute the residual reaction solution remaining in the manganese carbonate ($MnCO_3$) precipitate.

Clause 16: The method of any one of clauses 5-15, wherein the treated rhodochrosite after drying contains at most 3% residual liquid.

Clause 17: The method of any one of clauses 5-16, wherein the stable rhodochrosite comprises 0.03-0.3 wt % of an anion or ligand of the phosphoric acid ($H_3PO_4$), sulfuric acid ($H_2SO_4$), organic acid, or salt of such acids.

Whereas particular aspects of this invention have been described above for purposes of illustration, it will be evident to those skilled in the art that numerous variations of the details of the present invention may be made without departing from the invention as defined in the appended claims.

The invention claimed is:

1. A stable rhodochrosite comprising manganese carbonate ($MnCO_3$) and 0.03-0.3 wt % of an anion or ligand of phosphoric acid ($H_3PO_4$), pyrophosphoric acid ($H_4P_2O_7$), an organic acid, or a salt of such acids, or 0.03-0.3 wt % of a mixture of such anions and/or ligands.

2. The stable rhodochrosite of claim 1, wherein the anion or ligand comprises phosphate ($PO_4^{3-}$), pyrophosphate ($P_2O_7^{4-}$), citrate ($C_6H_5O_7^{3-}$), oxalate ($C_2O_4^{2-}$), acetate ($C_2H_3O_2^-$), tartrate ($C_4H_4O_6^{2-}$), and/or the ligand of ethylenediaminetetracetic acid ($[EDTA]^{4-}$).

3. The stable rhodochrosite of claim 1, wherein the organic acid comprises citric acid ($C_6H_8O_7$), oxalic acid ($C_2H_2O_4$), acetic acid ($C_2H_4O_2$), tartaric acid ($C_4H_6O_6$), and/or ethylenediaminetetraacetic acid ($C_{10}H_{16}N_2O_8$).

4. The stable rhodochrosite of claim 1, wherein the salt comprises mono-sodium phosphate ($NaH_2PO_4$), di-sodium phosphate ($Na_2HPO_4$), tri-sodium phosphate ($Na_3PO_4$), tetra-sodium phosphate ($Na_4P_2O_7$), mono-sodium citrate ($C_6H_7NaO_7$), di-sodium citrate ($C_6H_6Na_2O_7$), tri-sodium citrate ($Na_3C_6H_5O_7$), di-sodium oxalate ($Na_2C_2O_4$), mono-potassium acetate ($KCH_3COO$), mono-potassium tartrate ($C_4H_5KO_6$), and/or tri-potassium ethylenediaminetetraacetic acid (tri-potassium EDTA, $C_{10}H_{13}K_3N_2O_8$).

5. A method of producing stable rhodochrosite comprising manganese carbonate ($MnCO_3$), the method comprising:
    providing a rhodochrosite comprising manganese carbonate ($MnCO_3$);
    treating the rhodochrosite by applying an aqueous treatment solution of phosphoric acid ($H_3PO_4$), pyrophosphoric acid ($H_4P_2O_7$), an organic acid selected from the group consisting of citric acid ($C_6H_8O_7$), oxalic acid ($C_2H_2O_4$), acetic acid ($C_2H_4O_2$), tartaric acid ($C_4H_6O_6$), and/or ethylenediaminetetraacetic acid ($C_{10}H_{16}N_2O_8$), or a salt of such acids, or a mixture thereof to the provided rhodochrosite to form a treated rhodochrosite; and
    drying the treated rhodochrosite to produce stable rhodochrosite.

6. The method of claim 5, wherein the provided rhodochrosite comprises a manganese carbonate ($MnCO_3$) precipitate and liquid and the application of the aqueous treatment solution comprises displacing the liquid contained in the rhodochrosite with an approximately equal amount of treatment solution.

7. The method of claim 5, wherein the aqueous treatment solution is sprayed on the rhodochrosite.

8. The method of claim 5, wherein the aqueous treatment solution is mixed with the rhodochrosite in a blender.

9. The method of claim 5, wherein the aqueous treatment solution applied to the rhodochrosite comprises 0.3-3.0 grams of anions and/or ligands of the phosphoric acid ($H_3PO_4$), pyrophosphoric acid ($H_4P_2O_7$), organic acids, or salts of such acids for each 1000 grams, on a dried basis, of rhodochrosite that is being treated.

10. The method of claim 9, wherein the anion or ligand comprises phosphate ($PO_4^{3-}$), pyrophosphate ($P_2O_7^{4-}$), citrate ($C_6H_5O_7^{3-}$), oxalate ($C_2O_4^{2-}$), acetate ($C_2H_3O_2^{-}$), tartrate ($C_4H_4O_6^{2-}$), and/or the ligand of ethylenediaminetetraacetic acid ($[EDTA]^{4-}$).

11. The method of claim 5, wherein the salt comprises mono-sodium phosphate ($NaH_2PO_4$), di-sodium phosphate ($Na_2HPO_4$), tri-sodium phosphate ($Na_3PO_4$), tetra-sodium phosphate ($Na_4P_2O_7$), mono-sodium citrate ($C_6H_7NaO_7$), di-sodium citrate ($C_6H_6Na_2O_7$), tri-sodium citrate ($Na_3C_6H_5O_7$), di-sodium oxalate ($Na_2C_2O_4$), mono-potassium acetate ($KCH_3COO$), mono-potassium tartrate ($C_4H_5KO_6$), and/or tri-potassium ethylenediaminetetraacetic acid (tri-potassium EDTA, $C_{10}H_{13}K_3N_2O_8$).

12. The method of claim 5, wherein the provided rhodochrosite comprises a manganese carbonate ($MnCO_3$) precipitate obtained by mixing a solution comprising Mn with a solution containing carbonate from which a manganese carbonate ($MnCO_3$) precipitates and a reaction solution is formed.

13. The method of claim 12, wherein the manganese carbonate ($MnCO_3$) precipitate has been substantially separated from the reaction solution but still contains residual reaction solution.

14. The method according to claim 13, wherein the manganese carbonate ($MnCO_3$) precipitate has been washed at least once with water to dilute the residual reaction solution remaining in the manganese carbonate ($MnCO_3$) precipitate.

15. The method of claim 5, wherein the treated rhodochrosite after drying contains at most 3% residual liquid.

16. The method of claim 5, wherein the stable rhodochrosite comprises 0.03-0.3 wt % of an anion or ligand of the phosphoric acid ($H_3PO_4$), organic acid, or salt of such acids.

17. A method of producing stable rhodochrosite comprising manganese carbonate ($MnCO_3$), the method comprising:
providing a rhodochrosite comprising manganese carbonate ($MnCO_3$);
treating the rhodochrosite by applying an aqueous treatment solution of phosphoric acid ($H_3PO_4$), pyrophosphoric acid ($H_4P_2O_7$), an organic acid, or a salt of such acids, or a mixture thereof to the provided rhodochrosite to form a treated rhodochrosite; and
drying the treated rhodochrosite to produce stable rhodochrosite,
wherein the stable rhodochrosite comprises 0.03-0.3 wt % of an anion or ligand of the phosphoric acid ($H_3PO_4$), pyrophosphoric acid ($H_4P_2O_7$), organic acid, or salt of such acids.

18. The method of claim 17, wherein the provided rhodochrosite comprises a manganese carbonate ($MnCO_3$) precipitate and liquid and the application of the aqueous treatment solution comprises displacing the liquid contained in the rhodochrosite with an approximately equal amount of treatment solution.

19. The method of claim 17, wherein the aqueous treatment solution is sprayed on the rhodochrosite.

20. The method of claim 17, wherein the provided rhodochrosite comprises a manganese carbonate ($MnCO_3$) precipitate obtained by mixing a solution comprising Mn with a solution containing carbonate from which a manganese carbonate ($MnCO_3$) precipitates and a reaction solution is formed.

* * * * *

UNITED STATES PATENT AND TRADEMARK OFFICE
CERTIFICATE OF CORRECTION

Page 1 of 1

PATENT NO. : 11,198,618 B2
APPLICATION NO. : 16/500221
DATED : December 14, 2021
INVENTOR(S) : Jean-Bruno R. B. Soupart et al.

It is certified that error appears in the above-identified patent and that said Letters Patent is hereby corrected as shown below:

In the Claims

Column 26, Line 38, Claim 2, delete "($C_2H_3O_2^-$," and insert -- ($C_2H_3O_2^-$), --

Signed and Sealed this
First Day of March, 2022

Drew Hirshfeld
*Performing the Functions and Duties of the*
*Under Secretary of Commerce for Intellectual Property and*
*Director of the United States Patent and Trademark Office*